(12) United States Patent
Warren et al.

(10) Patent No.: US 10,989,109 B2
(45) Date of Patent: Apr. 27, 2021

(54) FUEL IGNITION METHODS FOR OPPOSED PISTON ENGINES AND RELATED STRUCTURES

(71) Applicant: Warren Engine Company, Alexandria, VA (US)

(72) Inventors: James Warren, Alexandria, VA (US); William Vincent Meyers, Jr., Sherwood Forest, MD (US); Steven Niswander, Bluemont, VA (US)

(*) Notice: Subject to any disclaimer, the term of this patent is extended or adjusted under 35 U.S.C. 154(b) by 0 days.

(21) Appl. No.: 16/514,913

(22) Filed: Jul. 17, 2019

(65) Prior Publication Data

US 2020/0025064 A1 Jan. 23, 2020

Related U.S. Application Data

(60) Provisional application No. 62/699,957, filed on Jul. 18, 2018.

(51) Int. Cl.
| | |
|---|---|
| *F01B 7/12* | (2006.01) |
| *F02B 75/28* | (2006.01) |
| *F02F 3/26* | (2006.01) |
| *F16J 1/09* | (2006.01) |
| *F02F 3/24* | (2006.01) |
| *F02F 3/28* | (2006.01) |

(52) U.S. Cl.
CPC ............. *F02B 75/282* (2013.01); *F02F 3/24* (2013.01); *F02F 3/26* (2013.01); *F02F 3/28* (2013.01); *F16J 1/09* (2013.01)

(58) Field of Classification Search
CPC .. F02B 23/0627; F02B 75/28; F02B 23/0621; F01B 7/02

USPC ....................................................... 123/51 R
See application file for complete search history.

(56) References Cited

U.S. PATENT DOCUMENTS

| | | | | |
|---|---|---|---|---|
| 2,256,776 | A * | 9/1941 | Kammer ................. | F02B 19/04 123/256 |
| 2,396,429 | A * | 3/1946 | Krygsman .............. | F02B 75/28 123/51 B |
| 2,505,999 | A * | 5/1950 | Smith ................. | F02B 23/0672 123/262 |
| 3,897,769 | A * | 8/1975 | Jozlin ..................... | F02B 23/00 123/286 |
| 4,572,123 | A * | 2/1986 | Evans ................. | F02B 23/0627 123/262 |
| 4,898,135 | A * | 2/1990 | Failla ..................... | F02B 21/02 123/263 |
| 5,042,441 | A * | 8/1991 | Paul ...................... | F02B 75/225 123/276 |
| 5,083,530 | A * | 1/1992 | Rassey ..................... | F01B 7/14 123/279 |
| 6,557,520 | B2 * | 5/2003 | Roberts, Jr. ............. | F02B 19/04 123/276 |
| 9,909,489 | B1 * | 3/2018 | Koci ................... | F02B 23/0648 |
| 10,316,734 | B2 * | 6/2019 | Svensson .................. | F02F 3/24 |
| 2008/0127947 | A1 * | 6/2008 | Hofbauer .............. | F02B 75/287 123/51 R |
| 2011/0271932 | A1 * | 11/2011 | Fuqua ..................... | F02B 75/28 123/301 |

(Continued)

*Primary Examiner* — Long T Tran
*Assistant Examiner* — James J Kim
(74) *Attorney, Agent, or Firm* — Capitol Patent & Trademark Law Firm

(57) ABSTRACT

Fuel is ignited in an opposed-piston engine by the mating of unique protruding and recessed portions of opposed pistons.

6 Claims, 1 Drawing Sheet

(56) References Cited

U.S. PATENT DOCUMENTS

| | | | |
|---|---|---|---|
| 2014/0083396 A1* | 3/2014 | Burton | F02B 75/28 123/51 R |
| 2016/0252067 A1* | 9/2016 | Johnson | F02B 75/282 123/51 R |
| 2017/0145899 A1* | 5/2017 | Singh | F02B 19/10 |

* cited by examiner

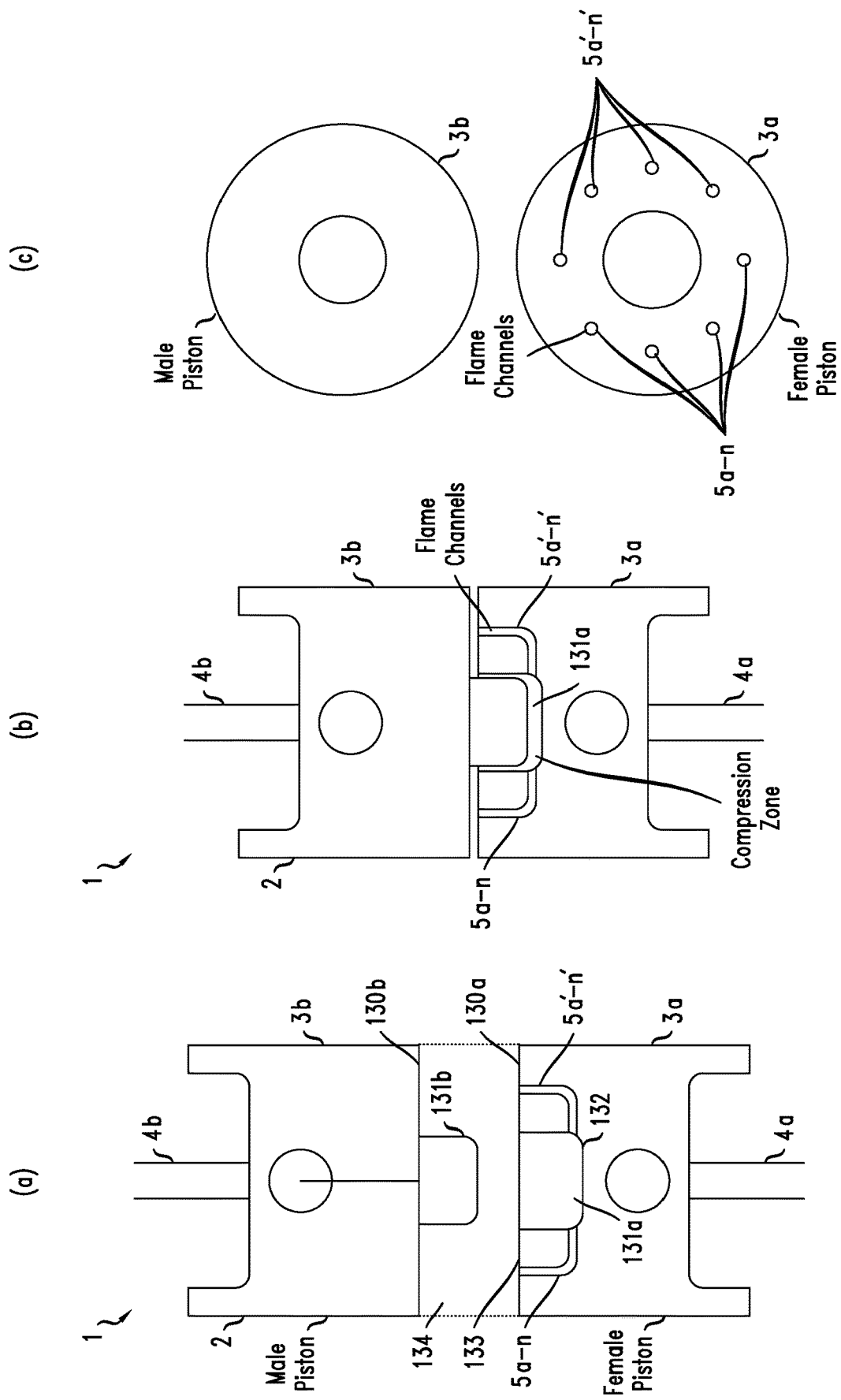

FUEL IGNITION METHODS FOR OPPOSED PISTON ENGINES AND RELATED STRUCTURES

RELATED APPLICATION

This application claims priority to U.S. Provisional Application No. 62/699,957 filed Jul. 18, 2018 (the "'957 Application") and incorporates by reference the entirety of the disclosure of the '957 Application.

INTRODUCTION

This section introduces aspects that may be helpful to facilitate a better understanding of the described invention(s). Accordingly, the statements in this section are to be read in this light and are not to be understood as admissions about what is, or what is not, in the prior art.

Existing compression-ignition engines operate almost exclusively with direct injection because they have no means to control the timing of the ignition of the fuel. In addition, with certain types of existing compression ignition, opposed piston engines running on diesel, and other hydrocarbon fuels, there is an ongoing challenge to efficiently and effectively ignite the fuel mixture within the combustion chamber and begin the combustion process. One of the issues is that existing diesel engines require high compression ratios (e.g., 22:1) to operate effectively which puts a high strain on an engine.

Thus, one of the challenges is to provide relatively low compression within the engine while still providing enough compressive to ignite a "heavy" fuel (e.g., diesel). Stated another way, it is desirable to provide a compression-ignition system that can operate at lower overall cylinder pressures than existing methods allow, substantially reducing the stresses on the engine's internal components while still allowing the engine to operate on heavy fuels. In addition, it is desirable to provide a charge to homogenous fuel (fuel that is incudes air and fuel mixed together) prior to entering into a cylinder, while retaining the benefits of compression ignition, resulting in improved combustion and lowered emissions. It is also desirable to provide for the use of a homogenous charge ignited through compression, but with a far greater degree of precision than would be possible using an existing design or process.

SUMMARY

Embodiments of the invention provide opposed piston engines, where each engine may comprise: one or more or a plurality of cylinders. each cylinder comprising a respective pair of opposed pistons; a recessed portion formed in a top surface of a first piston of each of the cylinders; a protruding portion formed on a top surface of a second piston for each of the cylinders and configured to correspond to a shape of the recessed portion and substantially fill the recessed portion of the second piston residing within the same cylinder, where the recessed and protruding portions are operable to ignite a portion of homogenous fuel trapped in the recessed portion as the respective pair of pistons move towards top dead center; and a plurality of channels in radial array within the first piston, wherein each channel may begin at an interior or inner wall of the recessed portion and extends to an ending position at a combustion chamber to communicate the ignited portion of the homogenous fuel to bulk homogenous fuel within the combustion chamber to ignite the bulk fuel and allow heat and excess pressure of combustion to be expelled.

In another embodiment the recessed and protruding portions may comprise annular recessed and protruding.

In yet another embodiment, the size of the recessed and protruding portions and channels may be configured to provide a compression ratio for a type of fuel.

The present invention also provides for inventive methods for igniting fuel in an opposed piston engine, one such method comprising compressing and igniting a portion of homogenous fuel trapped within a recessed portion of a first opposed piston by moving the first piston and a second opposed piston comprising a protruding portion towards top dead center within a cylinder, the protruding portion corresponds to a shape of the recessed portion; and communicating the ignited portion of homogenous fuel through a plurality of channels in radial array within the first piston, wherein each channel begins at an interior wall of the recessed portion and extends to an ending position at a combustion chamber to ignite bulk homogenous fuel within the combustion chamber.

BRIEF DESCRIPTION OF THE DRAWINGS

FIG. 1 depicts an example of a cylinder of an inventive opposed piston engine in accordance with the present invention.

DETAILED DESCRIPTION OF THE INVENTION

To the extent that any of the figures or text included herein depicts or describes dimensions or operating parameters it should be understood that such information is merely exemplary to aid the reader in understanding the embodiments described herein. It should be understood, therefore, that such information is provided to enable one skilled in the art to make and use an exemplary embodiment of the invention without departing from the scope of the invention.

It should be understood that, although specific exemplary embodiments are discussed herein, there is no intent to limit the scope of the present invention to such embodiments. To the contrary, it should be understood that the exemplary embodiments discussed herein are for illustrative purposes, and that modified and alternative embodiments may be implemented without departing from the scope of the present invention.

It should also be noted that one or more exemplary embodiments may be described as a process or method. Although a process/method may be described as sequential, it should be understood that such a process/method may be performed in parallel, concurrently or simultaneously. In addition, the order of each step within a process/method may be re-arranged. A process/method may be terminated when completed and may also include additional steps not included in a description of the process/method.

As used herein, the term "and/or" includes any and all combinations of one or more of the associated listed items. As used herein, the singular forms "a," "an" and "the" are intended to include the plural form, unless the context and/or common sense indicates otherwise.

As used herein, the term "embodiment" and/or "exemplary" refers to an example of the present invention.

The novel aspects of the present invention may be incorporated into a number of engines, including, but not limited to, U.S. Pat. Nos. 9,249,673, 9,708,976, 9,869,244, and 8,113,164, the teachings of which are incorporated by reference herein in their respective entireties.

Referring now to FIG. 1, and in accordance with the present invention, an inventive opposed piston engine 1 includes a housing (not shown) for containment of other constituents of the engine 1. For example, one or more cylinders 2, each containing a respective pair of inventive opposed pistons 3a,3b. For the sake of brevity, one cylinder is shown in FIGS. 1 and 2 with a corresponding pair of opposed pistons though it should be understood that an inventive engine may comprise a plurality of pairs of inventive opposed pistons.

For each combustion cycle, each inventive piston 3a,3b may be longitudinally propelled along the inside of the cylinder 2 to reach top dead center by a corresponding rod 4a,4b, and withdrawn in the same manner, to reach bottom dead center. A first crank (not shown) may be operably connected to the first rod 4a, and a second crank (not shown) may be operably connected to the second rod 4b. Each crank may be driven by a set of gears or pulleys (not shown) in a known manner. Alternatively, the cranks may be actuated as otherwise known in the art.

A homogenous fuel may be injected into the combustion chamber 134 by a fuel injector, or by a valve/cam design known in the art (not shown). This fuel may be ignited by the inventive engine 2 as described in more detail below to drive the pistons 3a,3b.

In one embodiment, a homogenous fuel may be ignited as follows.

Referring again to FIG. 1, the first opposed piston 3a may comprise an inventive first top surface 130a where an inventive recessed or female portion 131a may be formed in the first top surface 130a for fluidic and operable communication with a second opposed piston 3b comprising a second top surface 130b. An inventive protruding or male portion 131b may be formed on the top surface of the inventive second top surface 130b, and is configured to correspond to the shape of the recessed portion 131a formed in the first top portion at the top dead center position. Accordingly, when the protruding portion 131b and the recessed portion 131a each concurrently reach top dead center, the two mate together in a lock and key fashion as the protruding portion 131b substantially fills the recessed portion 131a trapping a portion of the homogenous fuel within the now compressed volume of the recessed portion 131a. The resultant pressure increase causes a corresponding increase in the temperature of the homogenous fuel trapped within the recessed portion 131a. As the temperature increases, the flash point of the now trapped fuel is attained, thereby providing an ignition of the trapped fuel therein.

Because the volume of inventive, compressed recessed portions is much smaller than the volume of a non-inventive existing combustion chamber (e.g., if piston 3a had no recessed portion and piston 3b had no protruding portion) the pressures of compression are reduced. In one embodiment the pressure may be reduced to a compression ratio of 12:1. In turn, stresses on the engine 2 are reduced. However, even though pressures have been reduced versus existing methods, the inventive engine 2 provides for the ignition of the homogenous fuel.

Continuing, a plurality of channels 5a-n, 5a'-n' may be bored or machined in a known manner, in radial array and within the first piston 3a, wherein each channel may begin at an interior or inner wall 132a of the recessed portion 131a and extend inwardly to the combustion chamber 134. Accordingly, the interior of the annular recessed portion 131a may fluidly communicate an ignited, homogenous fuel to bulk homogenous fuel within the combustion chamber 134 to ignite that fuel as well.

The channels 5a-n, 5a'-n' may provide a pressure release but still accommodate a sufficient increase in the compression within the combustion chamber formed by the movement of the pistons 3a,3b towards one another towards top dead center within the cylinder 2. As the pressure or compression increases at top dead center, the temperature also increases as per the natural gas law, PV=nRT. Accordingly, as the volume of the recessed portion 131a decreases from its initial value prior to movement of the protruding portion 131b into the recessed portion 131a to a final value as the pistons 3a,3b reach top dead center, the localized pressure within the recessed portion 131a greatly increases, and correspondingly, so does the temperature within the recessed portion 131a. In one embodiment, the relative compression increase may be on the order of 1:10 from an initial value prior to movement of the protruding portion 131b into the recessed portion 131a to a final value as the pistons 3a,3b reach top dead center. Accordingly, ignition may occur as the flash point of the fuel air mixture is attained at greater compression or pressure. The heat and excess pressure of combustion may then be shunted or otherwise communicated (i.e., expelled) through the plurality of channels 5a-n, 5a'-n', while yet still providing sufficient power to drive the engine 1. It should be understood that the dimensions and volume (size) of the recessed portion 131a, the protruding portion 131b, and/or the plurality of channels 5a-n, 5a'-n' (size and number), may be based on the type of fuel employed, for example. Stated another way, the engine 1 may be configured to provide a desired compression ratio for the type of fuel to be used with the engine by selecting the size of the portions 131a,b and size and number of channels 5a-n, 5a'-n'.

In yet another embodiment, the recessed or female portion 131a may be formed as an annular recessed portion and protruding or male portion 131b may be formed as an annular protruding portion.

It should be appreciated that a plurality of cylinders formed as described above may be positioned (e.g., juxtaposed to each other within a housing), thereby multiplying the total power produced by an inventive engine 1. In yet another aspect of the invention, the fuel may be treated with a carbon-removing solvent. Accordingly, over time, carbon residues within or on the inventive recessed portions, protruding portions, and plurality of channels described herein may be removed by the periodic introduction of a high-temperature, carbon removing solvent. Such a high temperature solvent may be mixed with the homogenous fuel air mixture to thereby mitigate carbon buildup within the combustion chamber. The fuel air mixture may be introduced into a combustion chamber by fuel injector, or, by a valve/cam design as known in the art.

We claim:

1. An opposed piston engine comprising:
   one or more cylinders, each cylinder comprising a respective pair of opposed pistons;
   a recessed portion formed in a top surface of a first opposed piston of each of the cylinders to receive substantially all of a protruding portion formed on a top surface of a second opposed piston for each of the cylinders;
   such a protruding portion formed on such a top surface of such a second opposed piston for each of the cylinders and configured to correspond to a shape of the recessed portion and substantially fill the recessed portion, the recessed and protruding portions operable to ignite a portion of homogenous fuel trapped in the recessed portion as the first and second pistons move towards top dead center; and a plurality of channels in radial array within the first piston, wherein each channel begins at an interior wall of the recessed portion that receives substantially all of a respective protruding portion and extends to an ending position at a combustion chamber to communicate the ignited portion of the homogenous fuel to bulk homogenous fuel within the combustion chamber to ignite the bulk fuel and allow heat and excess pressure of combustion to be expelled.

2. The engine as in claim 1 wherein the size of the recessed and protruding portions and channels are configured to provide a compression ratio for the type of fuel.

3. The engine as in claim 1 wherein the recessed portion comprises an annular recessed portion and the protruding portion comprises an annular protruding portion.

4. An opposed piston engine comprising:

a plurality of cylinders, each cylinder comprising a respective pair of opposed pistons;

an annular recessed portion formed in a top surface of a first opposed piston of each of the cylinders to receive substantially all of a protruding portion formed on a top surface of a second opposed piston for each of the cylinders;

such a protruding portion formed on such a top surface of such a second opposed piston for each of the cylinders and configured to correspond to a shape of the recessed portion and substantially fill the recessed portion, the recessed and protruding portions operable to ignite a portion of homogenous fuel trapped in the recessed portion as the first and second pistons move towards top dead center; and a plurality of channels in radial array within the first piston, wherein each channel begins at an interior wall of the annular recessed portion that receives substantially all of a respective protruding portion and extends to an ending position at a combustion chamber to communicate the ignited portion of the homogenous fuel to bulk homogenous fuel within the combustion chamber to ignite the bulk fuel and allow heat and excess pressure of combustion to be expelled.

5. A method for igniting fuel in an opposed piston engine comprising:

compressing and igniting a portion of homogenous fuel trapped within a recessed portion of a first opposed piston that is configured to receive substantially all of a protruding portion formed on a top surface of a second opposed piston for each of the cylinders by moving the first piston and such a second opposed piston comprising such a protruding portion towards top dead center within a cylinder, the protruding portion corresponds to a shape of the recessed portion and substantially fills the recessed portion; and communicating the ignited portion of homogenous fuel through a plurality of channels in radial array within the first piston, wherein each channel begins at an interior wall of the recessed portion that receives substantially all of a respective protruding portion and extends to an ending position at a combustion chamber to ignite bulk homogenous fuel within the combustion chamber.

6. The method as in claim 5 wherein the recessed portion comprises an annular recessed portion and the protruding portion comprises an annular protruding portion.

\* \* \* \* \*